(12) United States Patent
Bing et al.

(10) Patent No.: US 7,020,471 B2
(45) Date of Patent: Mar. 28, 2006

(54) METHOD FOR DATA COMMUNICATION WITH SUBSCRIBER STATIONS, AND A RADIO COMMUNICATIONS NETWORK FOR IMPLEMENTING THE METHOD

(75) Inventors: Torsten Bing, München (DE); Edgar Bolinth, Mönchengladbach (DE); Arndt Kadelka, Köln (DE); Andreas Krämling, Bonn (DE); Matthias Lott, Neuried (DE); Egon Schulz, München (DE); Bernhard Wegmann, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 176 days.

(21) Appl. No.: 10/344,101

(22) PCT Filed: Aug. 7, 2001

(86) PCT No.: PCT/DE01/03019

§ 371 (c)(1),
(2), (4) Date: Jun. 12, 2003

(87) PCT Pub. No.: WO02/13408

PCT Pub. Date: Feb. 14, 2002

(65) Prior Publication Data
US 2004/0023649 A1 Feb. 5, 2004

(30) Foreign Application Priority Data
Aug. 8, 2000 (DE) ................................ 100 38 668

(51) Int. Cl.
*H04Q 7/20* (2006.01)

(52) U.S. Cl. .................. 455/447; 455/422.1; 455/507; 370/321; 370/336; 370/337; 370/347; 370/442

(58) Field of Classification Search ............. 455/422.1, 455/443, 450, 453, 464, 507, 509, 447; 370/319–322, 370/335–337, 342, 344, 347, 441, 442
See application file for complete search history.

(56) References Cited

U.S. PATENT DOCUMENTS

| | | | | |
|---|---|---|---|---|
| 5,185,739 | A | * | 2/1993 | Spear .......................... 370/337 |
| 5,594,720 | A | * | 1/1997 | Papadopoulos et al. ..... 370/330 |
| 5,613,198 | A | * | 3/1997 | Ahmadi et al. .............. 370/337 |
| 5,999,818 | A | * | 12/1999 | Gilbert et al. .............. 455/448 |

(Continued)

FOREIGN PATENT DOCUMENTS

DE 195 35 329 3/1997

(Continued)

OTHER PUBLICATIONS

Pauli et al., "First Performance Results of BRAIN", Oct. 1, 2000, pp. 35-40.

(Continued)

*Primary Examiner*—William Trost
*Assistant Examiner*—James D Ewart
(74) *Attorney, Agent, or Firm*—Staas & Halsey LLP

(57) ABSTRACT

In a radio communications network, transmission time is divided into a succession of frames for conducting data communications with subscriber stations located within a coverage area of two central stations of the network. In a first broadcast phase of each frame, a first central station transmits first frame format information, which defines a first downlink phase of the frame and a first uplink phase. In the same frame, a second central station transmits, on the same frequency, second frame format information, which defines a second downlink phase and a second uplink phase for the communication of subscriber stations with the second central station, whereby the phases with a frame do not overlap.

11 Claims, 5 Drawing Sheets

U.S. PATENT DOCUMENTS

| | | | |
|---|---|---|---|
| 6,137,787 A * | 10/2000 | Chawla et al. | 370/337 |
| 6,657,982 B1 * | 12/2003 | Fong et al. | 370/336 |
| 6,704,572 B1 * | 3/2004 | Whinnett et al. | 455/452.1 |
| 6,717,932 B1 * | 4/2004 | Blanc et al. | 370/342 |
| 6,839,333 B1 * | 1/2005 | Åkerberg | 370/330 |

FOREIGN PATENT DOCUMENTS

| | | |
|---|---|---|
| DE | 198 24 961 | 12/1999 |
| EP | 1 037 484 | 9/2000 |

OTHER PUBLICATIONS

Jush et al., "Overview and Performance of HIPERLAN Type 2—A Standard for Broadband Wireless Communications" May 15, 2000, pp. 112-117.

Vornefeld et al., "Fast Collision Resolution for Real Time Services in SDMA Based Wireless ATM Networks", May 1999, pp. 1151-1155.

* cited by examiner

METHOD FOR DATA COMMUNICATION WITH SUBSCRIBER STATIONS, AND A RADIO COMMUNICATIONS NETWORK FOR IMPLEMENTING THE METHOD

CROSS REFERENCE TO RELATED APPLICATIONS

This application is based on and hereby claims priority to German Application No. 100 38 668.7 filed on Aug. 8, 2000, the contents of which are hereby incorporated by reference.

BACKGROUND OF THE INVENTION

1. Field of the Invention

The present invention relates to data communication with subscriber stations in radio communications networks. To be more precise, the invention relates to the problem of joint use of radio resources by a number of central stations in a radio communications network such as this.

2. Description of the Related Art

Access methods (Multiple Access, MA) which define the right of an individual station to access the medium are used in order to allow a number of stations to access a shared transmission medium in communications systems of any desired type. A distinction is in this case drawn as to whether the medium is subdivided in the time domain (Time Division Multiple Access TDMA), in the frequency domain (FDMA), in the code domain (CDMA) or in the space domain (SDMA) between the stations.

If the joint use takes place in the time domain, there is a problem in defining the time period during which one station has exclusive access to the transmission medium, in order to avoid collisions occurring. If a number of stations access the shared medium in an uncoordinated manner, collisions can frequently occur as soon as more than one station is transmitting at the same time. If a central station (for example a base station) monitors the time access for a group of stations (for example mobile stations), collisions can be prevented for these stations.

If the aim is to supply an area which is larger than the maximum range of a central station, a number of central stations must be used. These central stations are normally assigned different frequency bands for communication with subscriber stations which are within range of them, in order in this way to avoid collisions between the accesses by the central stations. If a supply area is subdivided into cells which are supplied by fixed-position stations (base stations), and base stations may use only a limited number of frequency bands, this results in a cellular radio system.

The number of frequency bands which are available for a radio communications system is limited. This means that there must be a number of central stations in a radio communications network having a large number of cells, sharing the use of one and the same frequency band. Efforts are normally made to arrange the cells geographically such that cells which use the same frequency band are sufficiently far away from one another that radio signals which are transmitted in one of these cells no longer interfere with communication in another which is operating at the same frequency.

As the density of subscriber stations rises continuously and the communication traffic in the mobile radio networks rises in a corresponding manner, this principle reaches its limits, however, since the number of connections which can be handled simultaneously using a given frequency band, and hence the number of subscribers who can be controlled simultaneously in one cell, are limited. In order to increase the transmission capacity, it would admittedly be possible to consider dividing a cell and assigning different frequency bands for each of the two resultant cell elements; however, this generally leads to the problem of the frequency which is to be used in one of the newly created cells already being used by another cell in the vicinity, which is not sufficiently far away to make it possible to preclude mutual interference.

Similar problems can occur if it is impossible to supply all the locations within a given cell with a radio signal of sufficient intensity to allow problem-free mobile communication. Since the transmission power of a central station cannot be increased without running into the risk of causing interference in other cells that are operating at the same frequency in the radio communications system, and the transmission power of the subscriber stations, which are generally operated independently of the network, is restricted in any case, an improvement in the signal supply can be achieved only by "sharing" the central station between two different locations within the cell, with the difficulty that the "station elements" at the different locations must coordinate their radio traffic in order to avoid interfering with one another.

One approach for solving the problem of coordination of base stations which use the same frequency band has been proposed in DE 198 24 961 A1. In this known method, the transmission frame for one TDMA radio signal is subdivided into a number of containers, with one container representing a specific number of time slots in the TDMA frame, and the containers each being allocated for use by different base stations. One base station is therefore not allocated all the time slots in the frame but only a subset of them, which it can in each case allocate on the basis of any desired known method for communication with terminals.

One such method is suitable for communication when the amount of transmission traffic is constant, in particular for speech communication; however, there are problems in using this for data communication, where the requirements for the time response relating to the transmission are generally less stringent but where considerable amounts of data frequently need to be transmitted in short time periods. The capability to make use of packets which remain free in a synchronous channel for speech transmission for data transmission is restricted since each central station may have access only to those synchronous channels which correspond to the containers allocated to it. It is often uneconomic, or impossible, to allocate additional containers to a central station which has to transmit a large amount of data at short notice, since all the containers that are available within the frame are already being used by one central station.

Modern mobile radio standards which are also designed for mobile data communication, such as GPRS or HIPERLAN/2, no longer use the concept of synchronous channels which are predetermined by fixed time slots in a transmission frame and, instead of this, use frames whose structure is not predetermined in a fixed manner, but which each contain format information which provides a connected receiver with information about the format of the respective current frame and which, in particular, defines the location of uplink and downlink phases in the frame. In a system such as this, subscriber stations and a central station can each interchange different amounts of data from one frame to the next; a specific predetermined fraction of the transmission capacity, which does not vary with time, is no longer reserved for communication with a specific subscriber station and, instead, each subscriber station uses from one frame to the next precisely the transmission capacity which it requires, and transmission capacity which is not required for time-critical services such as speech transmission is completely available for asynchronous data transmission.

SUMMARY OF THE INVENTION

An object of the invention is to specify a method for data communication with subscriber stations in a radio communications network, which allows the same frequency band to be used by a number of central stations and in the process fully exploits the advantages offered by communications systems without a synchronous frame structure, such as HIPERLAN/2 or GPRS.

Since frame format information must be transmitted at the start of each frame in a communications system with a variable frame structure, in order to allow subscriber stations to identify the location of blocks which are intended for it within the frame, or the time which is allocated to it for uplink transmission within that frame, it is possible without any difficulties to allow a central station to transmit format information in each case leaves a part of the time period before the start of the next frame without any allocation to one phase or the other in the frame. In this way, one or more time periods remain free within the frame, and these can be used by a second central station, which is transmitted in the same frequency band as the first, in order itself to transmit frame format information and to use these remaining time intervals, or at least a part of them, for transmission to or from it.

In order to coordinate the two or more central stations which are using the same frequency, a shared administration unit is expediently used, which allocates the uplink and downlink phases to the central stations on the basis of their transmission requirement. This allocation process is in each case carried out in the same way as the transmission of the frame format information from new from one frame to the next, thus allowing quick reaction to changing transmission requirements of the central stations and/or of the subscriber stations which are communicated with them.

In this case, it is expedient for the central stations to inform the control unit of their transmission requirement broken down on the basis of priorities. This makes it possible for the control unit, when allocating transmission time to the central stations,,to first of all take account of the transmission requirement which must be satisfied as an essential condition for time-critical applications, and then to allocate the transmission time which still remains on the basis of urgency. In contrast to the situation with the container method, a central station which needs to transmit a large amount of data at short notice can thus use for this purpose not only a fraction of the frame period which is allocated to it as standard, but it is also granted access to all the transmission time which is not yet being used for higher-priority communications tasks within a given frame, by itself or by other central stations which are connected to that control unit.

There are various possible ways to share a transmission frame with a predetermined duration between two or more central stations. A first option is to allocate each central station a continuous time interval within the frame, formed of a broadcast phase in which the central station transmits frame format information which defines the use of the transmission time allocated to it, an uplink phase for transmission from the subscriber stations to the central station, and a downlink phase for transmission in the opposite direction. Sharing in this way has the advantage that it can be carried out with little complexity, since it requires that the frame be subdivided into only a small number of subintervals, which do not overlap. Since, however, the frame format information must be transmitted at the start of each frame, and the start of the time interval which is allocated to a central station may vary depending on the transmission requirement of the individual stations, it is necessary for this purpose for the central stations and subscriber stations to be able to process frames of variable duration.

This problem can be avoided by subdividing the transmission frames in such a way that the broadcast phases of the central stations follow one another directly. This makes it possible for each central station to transmit frame format information at defined times with a constant period to the subscriber stations which are connected to it, thus making it easier for the subscriber stations to monitor the frame format information.

The administration complexity in the control unit can also be restricted in this case, by allocating each central station a continuous time interval which in each case includes an uplink phase and a downlink phase.

The subdivision of the allocated continuous time interval into an uplink phase and a downlink phase can be carried out autonomously by each of the relevant central stations, since time collisions with the other central stations are precluded just by the allocation of the continuous time intervals.

In a further variant, broadcast phases and downlink phases of the central stations within one frame are in each case combined to form a first continuous time interval, and the uplink phases are combined to form a second continuous time interval. This variant has the advantage that the time delays which necessarily have to be complied with as a result of the signal delay times when changing between an uplink and a downlink are shortened, so that the available transmission time is used more efficiently.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
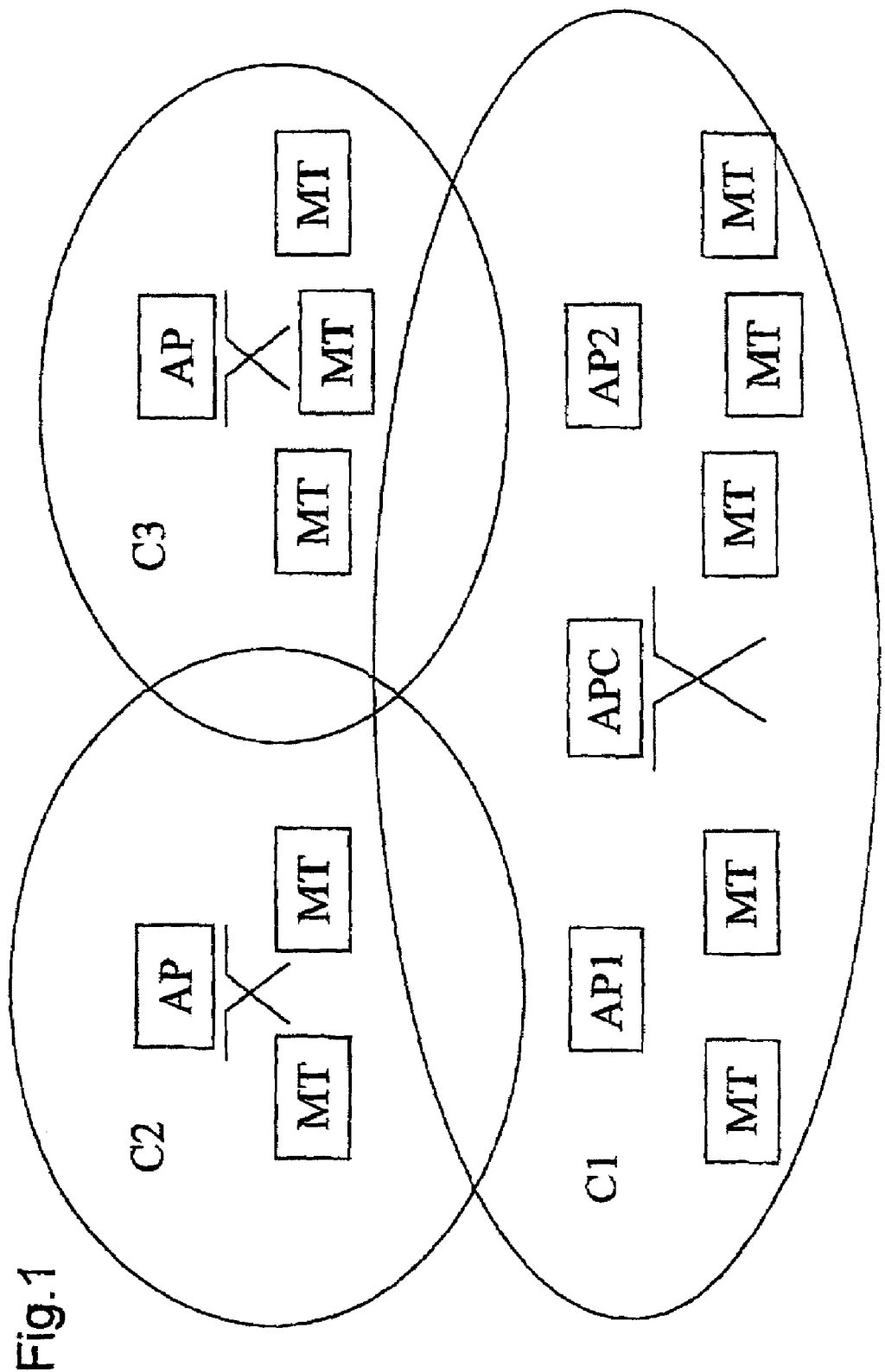
FIG. 1 is a block diagram of a radio communications system with one cell in which the method according to the invention is used.

Reference will now be made in detail to the preferred embodiments of the present invention, examples of which are illustrated in the accompanying drawings, wherein like reference numerals refer to like elements throughout.

FIG. 1 shows a block diagram of a HIPERLAN/2 network as an example of a radio communications network in which the present invention can be used. The network has a number of radio supply areas, three of which, C1, C2, C3, are illustrated in FIG. 1. Each supply area in a HIPERLAN/2 radio communications network conventionally has a so-called access point (AP), where access exists to the landline network, or a central controller (CC) as a central station which communicates with a number of subscriber stations MT which are within range of its radio signals, switching connections between subscriber stations in the same supply area or in different supply areas, or to a landline network (which is not illustrated). Supply areas which are adjacent to the central stations communicate with their subscriber stations in respectively different frequency bands, so that communication within one supply area does not interfere with the adjacent supply areas.

The supply area c1 differs from the conventional supply areas C2, C3 in that it has two central stations AP1, AP2 which use the same frequency band for communication with those subscriber stations MT which are within range of their radio signals. The extent of the supply area C1 thus corresponds to the combination of the regions which are in each case covered individually by the two central stations AP1, AP2. A control unit, which is referred to as APC (for Access Point Controller) coordinates the transmission and reception activity of the two central stations AP1, AP2. For this purpose, in each of the transmission frames, which each last for 2 milliseconds and are also referred to as MAC frames, the HIPERLAN/2 standard signals its communication requirement to the control unit APC which uses this information to subdivide the next MAC frame between the two central stations, and transmits a message to them which defines the time intervals within the next MAC frame which are available to each of the individual central stations AP1, AP2 for transmission and reception.

Parts of the transmission time may be permanently reserved for the individual central stations, for example in order to transmit signaling information which is essential for correct operation of the network. It is possible for the control unit APC to take account of these reserved transmission times itself in the allocation of the time intervals in a MAC frame, without the central stations themselves signaling to it the requirement for this time. Alternatively, the permanently reserved transmission time may also be requested from the control unit APC from one frame to the next, together with the time for the transmission requirement, which varies with time. In a situation where one central station has no subscriber stations to supply, this makes it possible for that central station to temporarily interrupt the radio traffic with the subscriber stations in its supply area on the relevant frequency band, or to start such radio traffic only when required. In a cellular radio communications system, this makes it possible, for example, when the frequency band which is allocated to a central station is overloaded, for that central station to temporarily "borrow" transmission time in a frequency band of an adjacent station in order to supply subscriber stations to a greater extent than that which is normally possible in a single frequency band.

A distinction is drawn between different priority levels when informing the control unit of the communication requirement. The highest priority level is that for time-critical connections which have already been established, in particular for speech connections which (in order to make it possible to ensure a satisfactory Quality of Service) are instructed that the transmission bandwidth is available for them in each MAC frame. The communication requirement of the central stations resulting from connections of this type must invariably be satisfied by the control unit. A lower priority communication requirement is associated with data transmission connections in which fluctuations in the amount of data transmitted in each frame and short-term interruptions are tolerable to a certain extent. The communication requirement for connections whose establishment has been requested for the first time by subscriber stations may be allocated to the same or to a different priority level. That proportion of the transmission time in a frame which has not been allocated by the control unit to connections in the highest priority level can be allocated on a proportional basis to the two central stations AP1, AP2 depending on their requirement. This makes it possible to achieve a high level of flexibility in the distribution of the transmission time; if one of the stations suddenly has an increased requirement for transmission time, the entire transmission time which has not yet been allocated in a fixed manner for connections with a higher priority can be allocated to it from one frame to the next.

Figure 2:
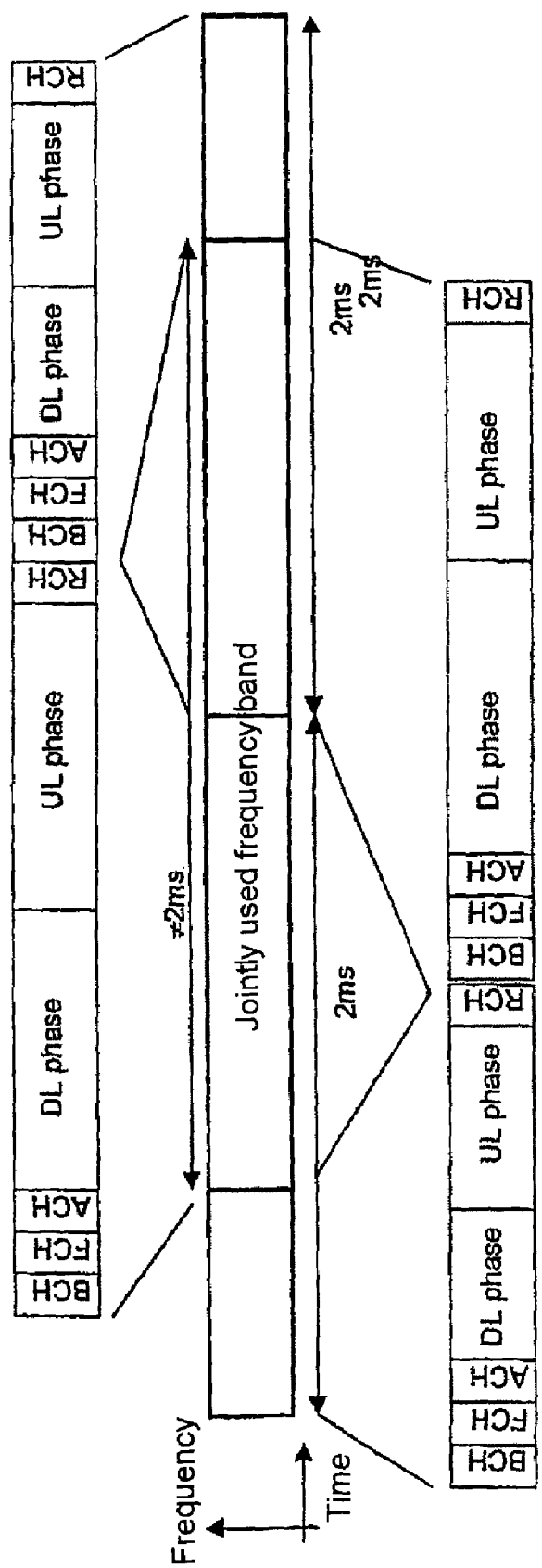
FIGS. 2–5 are examples of frame structures which are used for the method according to the invention.

FIG. 2 shows a first example of a frame structure which can be used by the central stations AP1, AP2 in the supply area C1 for radio traffic with their subscriber stations MT. The two central stations AP1, AP2 each alternately use the shared frequency band, with the continuous time interval which is used by one central station having the structure, which is known per se, of a HIPERLAN/2 frame, in which a broadcast phase in which frame format information and other information which is relevant for all the subscriber stations located in that cell is transmitted being followed by a downlink phase DL phase in which the central station transmits payload data to the subscriber stations, and an uplink phase UL phase in which the subscriber stations transmit to the central station, as well as a random access channel RCH which is used inter alia, by subscriber stations to signal to the central station that they wish to set up a connection. In order to distinguish between MAC frames, the time period which is allocated to a central station in an MAC frame such as this is in this case referred to as the "station frame".

In contrast to the conventional MAC frames in accordance with HIPERLAN/2, the downlink phase and uplink phase are, however, shortened in this case, so that the station frames which have been mentioned do not as standard fill the time period of 2 ms that is provided for one MAC frame. The station frames of the various central stations can jointly fill an MAC frame; however, it is also possible to provide for the time which is not required for transmission by any central station not to be allocated to any station frame.

While a first of the two central stations can always carry out its broadcast phase on the normal 2 ms cycle, it is possible with regard to the other central station for changes in the allocation of the transmission time to the stations to make it necessary to shift the start of the station frame that is allocated to it, hence resulting in a discrepancy in the value of 2 ms in the time interval between two broadcast phases. With the frame format shown in FIG. 2, it is therefore expedient for at least the frame format information which is transmitted by the second central station AP2 also to contain information for the subscriber stations stating when the next frame format information will be transmitted.

An alternative solution is for the change in the lengths of the station frames which are allocated to the two central stations by one 2 ms frame first of all to be restricted to a few tens of microseconds, so that, when subscriber stations have received frame format information, they can assume from this that the next frame format information will be received after a time interval of 2 ms plus or minus this maximum permissible change.

Figure 3:
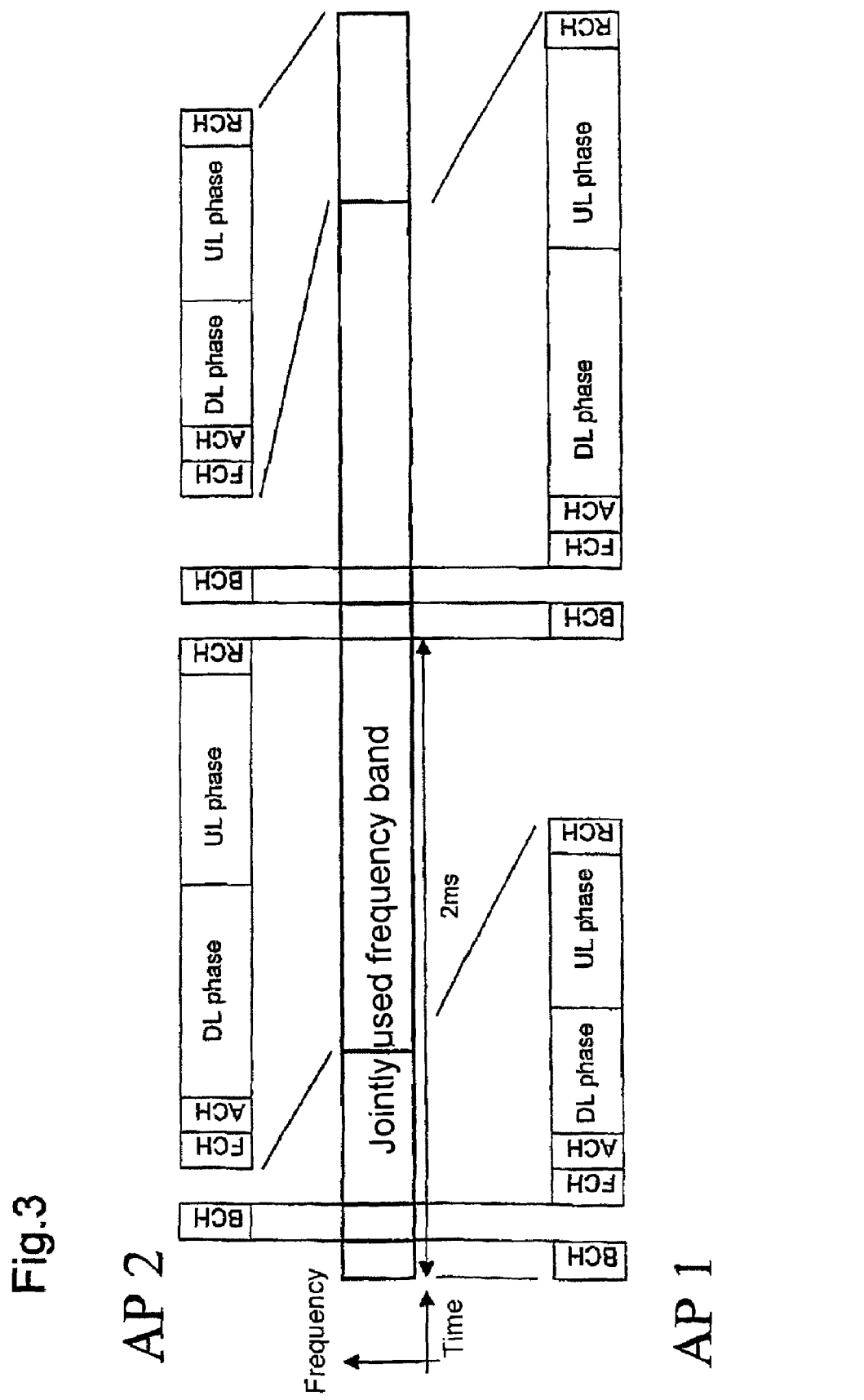

With the frame structure shown in FIG. 3, the two central stations each transmit the frame format information in the broadcast channel BCH immediately one after the other at the start of an MAC frame. In this way, precisely in time with the MAC frames, each subscriber station receives the frame format information that it requires in order to identify the start of the frame control channel FCH and associated control channel which are intended for it and from which it can find out which of the data items which are transmitted in the subsequent downlink phase are intended for it, and the time at which it may transmit to the central station AP1 or AP2 associated with it in the uplink phase of the station frame.

In the frame format shown in FIG. 3, the capability to change the duration of the station frames which are allocated to the various central stations from one MAC frame to the next is not subject to any restrictions.

Figure 4:
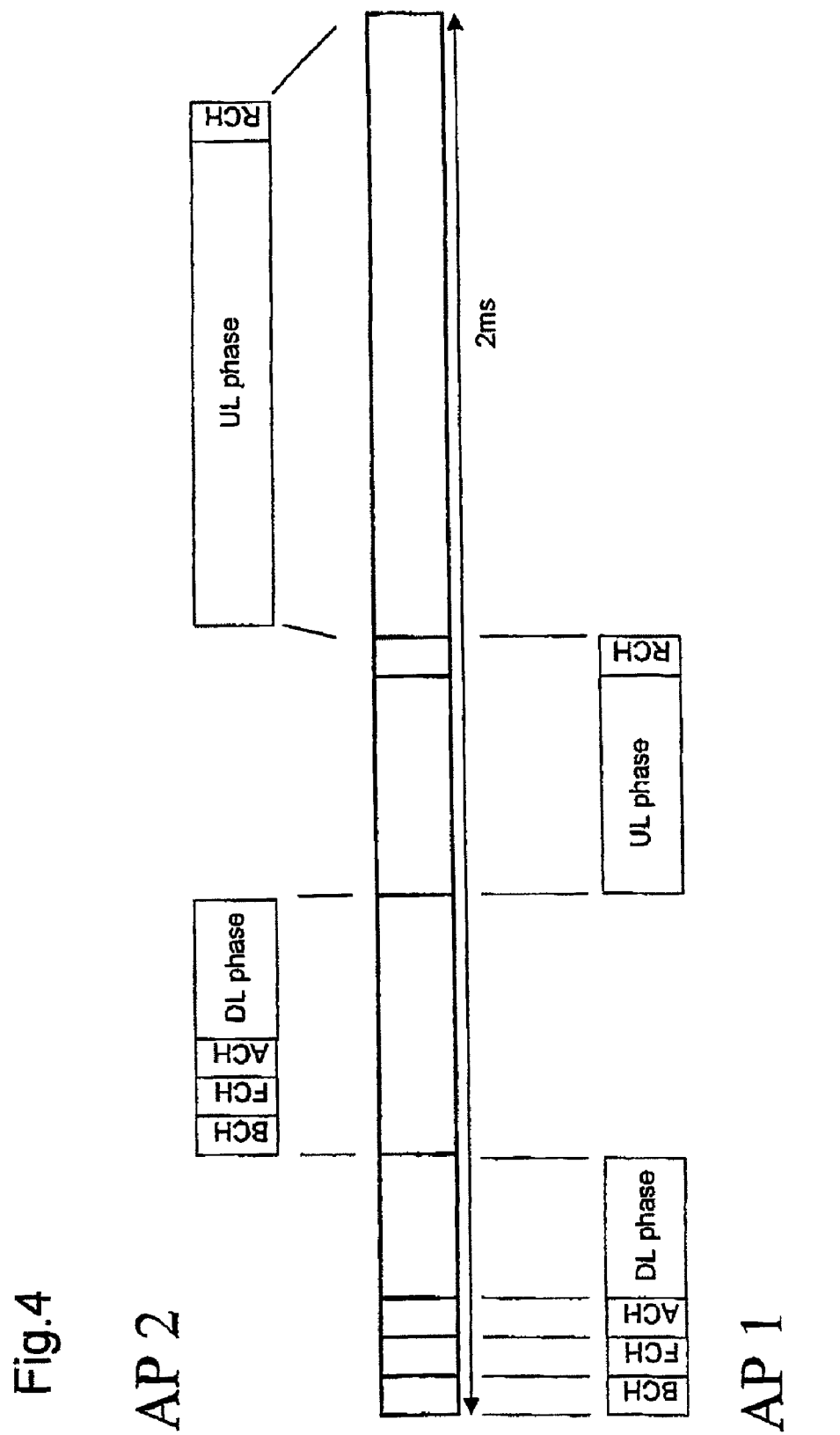

FIG. 4 shows a modification to the frame structure shown in FIG. 2, in which the individual central stations are not allocated any continuous time interval for transmission and for reception, but a transmission time interval (BCH, FCH, ACH, DL phase) for each central station is separated by a reception time interval (UL phase, RCH) for each station by a time interval which is in each case allocated to the other station. If this frame structure variant is used, the control unit APC not only decides on the proportion of an MAC frame which is allocated to each individual central station, that is to say the length of the station frames, but also defines the limits of the transmission and reception time intervals within each station frame. One advantage of this variant is that the transmission time is used more effectively. This is because a guard time interval has to be inserted during the change between transmission and reception, in which it is neither possible to transmit nor receive, with the length of this time interval being governed by the signal delay time between the central station and a subscriber station which is at the most remote location in the cell. While four such changes occur in each MAC frame with the frame structure shown in FIG. 2, there are now only two with the frame structure shown in FIG. 4. A further advantage of the frame structure shown in FIG. 4 is that the time interval between the associated control channel ACH for one central station and the uplink phase for this station is greater than that with the structure shown in FIG. 3. A subscriber station which has to transmit in the uplink phase to the relevant central station thus, on average, has precisely the same amount of time with the frame structure shown in FIG. 4 as with a conventional HIPERLAN/2 frame, in order to process the control information which is transmitted in the ACH channel, for example the timing advance or power control. Every conventional HIPERLAN/2 subscriber station is thus able to communicate with a central station which is using a frame structure as shown in FIG. 4.

The variable time durations of the phases of the frame structures described above may, of course, also be zero for individual phases and frames. In this way, by way of example, the first AP1 of the two central stations may at times be allocated all of the transmission/reception time in an MAC frame when the second central station AP2 has no data to transmit or the only data which it has to transmit can tolerate an interruption in the transmission for individual MAC frames, in order in this way to allow fast transmission of large amounts of time-critical data by the first station AP1.

Figure 5:
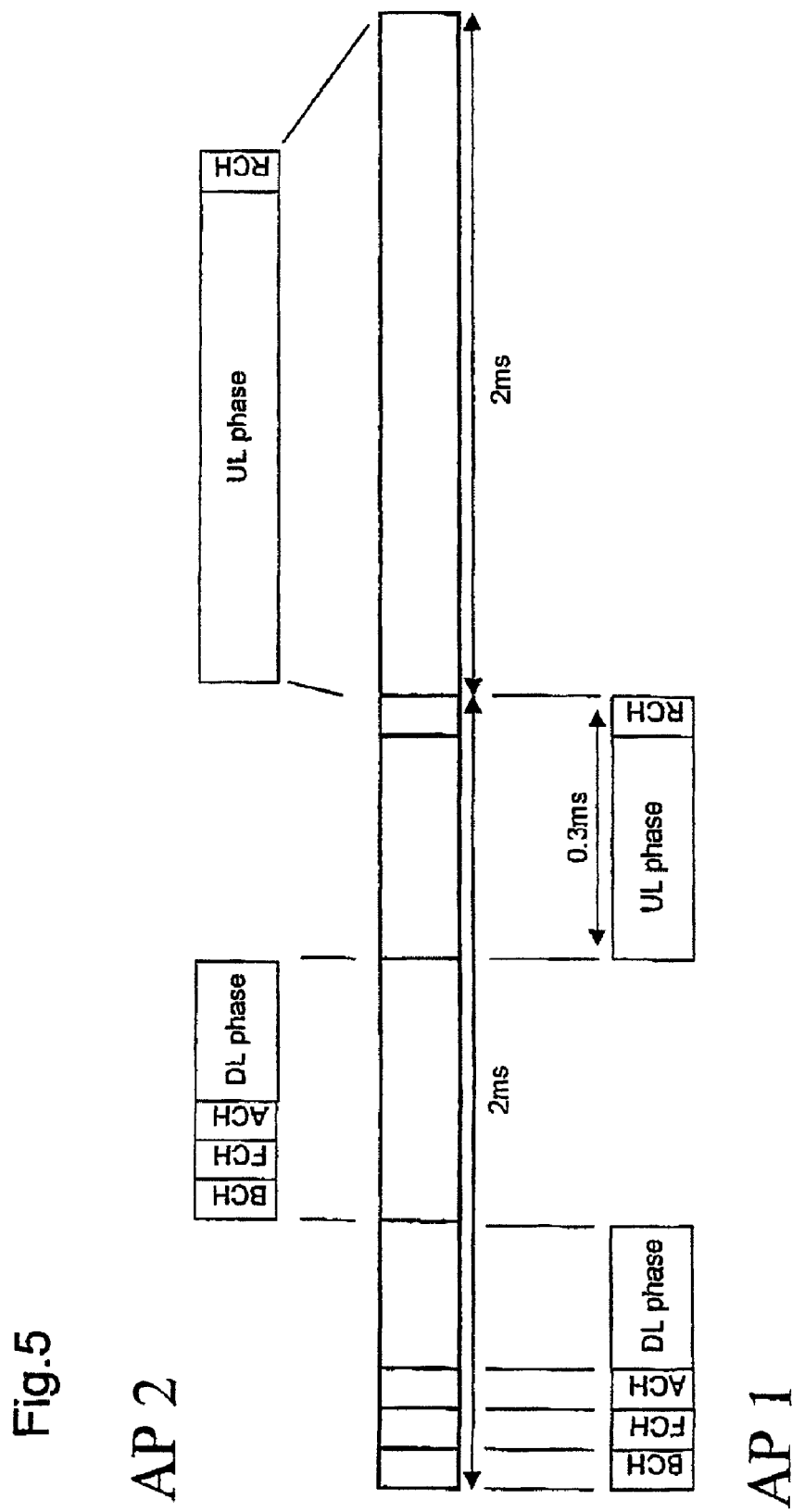

FIG. 5 shows a further modified frame structure, in which the sequence of the transmission and reception phases in the structure shown in FIG. 4 is distributed over two MAC frames, that is to say over a time interval of 4 ms. This structure also allows the allocation of long cohesive phases for uplinks or downlinks to one of the two central stations AP1 or AP2, so that large amounts of data can be transmitted in a cohesive manner, and the theoretical transmission capacity of one frequency band, which is 54 Mbps in a HIPERLAN/2 network, can be used virtually without any restriction for payload data transmission.

The frame structures described above may also, of course, be used for cells in which there are more than two central stations sharing a frequency band, by in each case inserting transmission and reception phases for the other stations between those of the two stations mentioned above.

Furthermore, the invention is not restricted to a HIPERLAN/2 network, but can be applied to any desired radio communications networks which support dynamic definition of the frame format.

In particular, these radio networks do not need to have a cellular structure; the principle of the invention can also be used without any difficulties in wire-free LANs (Local Area Networks) and ad-hoc networks (self-configuring networks). One example of an ad-hoc network standard where the invention can be used subject to certain extensions to the standard is the Bluetooth standard; even HIPERLAN/2 is subject to developments which are intended to lead to a self-configuration capability, in particular for applications in the domestic field.

The invention has been described in detail with particular reference to preferred embodiments thereof and examples, but it will be understood that variations and modifications can be effected within the spirit and scope of the invention.

The invention claimed is:

1. A method for data communication with subscriber stations in a radio communications network in which data transmission is subdivided into a sequence of frames, comprising:

transmitting from a first central station first frame format information in a first broadcast phase of each frame, the first frame format information defining a first downlink phase of the frame, in which payload data is transmitted from the first central station to the subscriber stations, and a first uplink phase, in which the subscriber stations are allowed to transmit to the first central station;

transmitting from at least one second central station second frame format information in at least one second broadcast phase in each frame, the second frame format information defining a second downlink phase and a second uplink phase for communication from subscriber stations to the second central station; and allocating a continuous time interval in one frame to each of the first and second central stations by a control unit as a function of transmission requirements received from the first and second central stations, where the continuous time interval is subdivided into an unlink phase and a downlink chase independently by each of the first and second central stations.

2. The method as claimed in claim 1, wherein the first and second central stations inform the control unit of the transmission requirements thereof broken down based on at least one of priority levels and fixed reservations.

3. The method as claimed in claim 2, wherein said allocating in each case takes place from one frame to at least one subsequent frame.

4. The method as claimed in claim 3, wherein said allocating allocates to each of the first and second central stations a continuous time interval in one frame, formed of a broadcast phase, an uplink phase and a downlink phase.

5. The method as claimed in claim 4, wherein the broadcast phase of the first and second central stations follow one another directly.

6. The method as claimed in claim 3, wherein said allocating allocates in each frame broadcast and downlink phases of the first and second central stations to form a first continuous time interval and uplink phases of the first and second central stations to form a second continuous time interval.

7. A radio communications network having a number of central stations for data communication with subscriber stations, comprising:

a control unit, connected to at least two central stations using an identical frequency, to allocate a continuous time interval in one frame to each of the at least two central stations as a function of a transmission requirement received from the at least two central stations, where the continuous time interval is subdivided into an unlink phase and a downlink phase independently by each of the at least two central stations.

8. The radio communications network as claimed in claim 7, wherein said control unit receives a message from each of the at least two central stations about the transmission requirement thereof.

9. The radio communications network as claimed in claim 8, wherein the message is broken down based on priorities of data to be transmitted.

10. The radio communications network as claimed in claim 9, wherein the radio communications network has a cellular structure.

11. The radio communications network as claimed in claim 10, wherein the radio communications network is one of a wire-free local area network and an ad-hoc network.

* * * * *